(12) United States Patent
Miller et al.

(10) Patent No.: US 11,328,292 B2
(45) Date of Patent: *May 10, 2022

(54) SYSTEMS AND METHODS FOR USE OF DISTRIBUTED LEDGER TECHNOLOGY FOR RECORDING AND UTILIZING CREDIT ACCOUNT TRANSACTION INFORMATION

(71) Applicant: Capital One Services, LLC, McLean, VA (US)

(72) Inventors: Walter Avery Miller, Glen Allen, VA (US); Robert Martin, Glen Allen, VA (US); Bradley W. Smith, Mechanicsville, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/597,078

(22) Filed: Oct. 9, 2019

(65) Prior Publication Data

US 2020/0042997 A1    Feb. 6, 2020

Related U.S. Application Data

(63) Continuation of application No. 15/911,837, filed on Mar. 5, 2018, now Pat. No. 10,489,780.

(51) Int. Cl.
| | | |
|---|---|---|
| *G06Q 20/38* | (2012.01) | |
| *G06F 16/18* | (2019.01) | |
| *G06F 21/62* | (2013.01) | |
| *H04L 9/06* | (2006.01) | |
| *G06Q 40/00* | (2012.01) | |

(Continued)

(52) U.S. Cl.
CPC ....... *G06Q 20/382* (2013.01); *G06F 16/1815* (2019.01); *G06F 21/6218* (2013.01);
(Continued)

(58) Field of Classification Search
CPC .... G06Q 20/382; G06Q 40/12; G06Q 20/389; G06Q 20/401; G06Q 2220/10;
(Continued)

(56) References Cited

U.S. PATENT DOCUMENTS

| | | |
|---|---|---|
| 9,785,369 B1 | 10/2017 | Ateniese et al. |
| 9,794,074 B2 | 10/2017 | Toll et al. |

(Continued)

FOREIGN PATENT DOCUMENTS

| | | |
|---|---|---|
| CA | 2941280 A1 | 3/2018 |
| CN | 106796688 A | 5/2017 |

OTHER PUBLICATIONS

White Paper: "Digital Assets on Public Blockchains,"; http://bitfury.com/content/5-white-papers-research/bitfury-digital_assets_on_public_blockchains-1.pdf; Mar. 15, 2016.

(Continued)

*Primary Examiner* — Zeshan Qayyum
*Assistant Examiner* — Yingying Zhou
(74) *Attorney, Agent, or Firm* — Troutman Pepper Hamilton Sanders LLP; Christopher J. Forstner; John A. Morrissett

(57) ABSTRACT

The disclosed technology includes a distributed ledger system that can include one or more transaction blocks that are associated with one or more transaction records of an account corresponding to the primary account number. The system may allocate a first type block in a first distributed ledger, and the first type block may be utilized to identify a classification type associated with the first primary account number. The system may receive, at the first node, a first transaction indication associated with the first primary account number. Responsive to receiving the first transaction indication, the system may bind a first transaction block to the first distributed ledger. Transaction blocks may be configured for selective control and/or selective replicated to other nodes of the system. In response to an end-of-cycle indication, the first transaction block may be locked to prevent further modification.

18 Claims, 6 Drawing Sheets

(51) Int. Cl.
    *G06Q 20/40* (2012.01)
    *H04L 29/06* (2006.01)
(52) U.S. Cl.
    CPC ......... *G06Q 20/389* (2013.01); *G06Q 20/401* (2013.01); *G06Q 40/12* (2013.12); *H04L 9/0637* (2013.01); *H04L 63/0428* (2013.01); *G06Q 2220/10* (2013.01)
(58) Field of Classification Search
    CPC ............ G06F 16/1815; G06F 21/6218; H04L 9/0637; H04L 63/0428
    See application file for complete search history.

(56) References Cited

U.S. PATENT DOCUMENTS

| | | |
|---|---|---|
| 2010/0070393 A1 | 3/2010 | Wells et al. |
| 2017/0132625 A1 | 5/2017 | Kennedy |
| 2017/0230375 A1 | 8/2017 | Kurian |
| 2017/0270493 A1* | 9/2017 | Lugli ................... G06Q 20/027 |
| 2017/0364936 A1 | 12/2017 | Balfour et al. |
| 2018/0048469 A1* | 2/2018 | Ateniese ............... H04L 63/062 |
| 2018/0060836 A1 | 3/2018 | Castagna |
| 2018/0285839 A1 | 10/2018 | Yang et al. |
| 2019/0164157 A1* | 5/2019 | Balaraman ............ H04L 9/3239 |

OTHER PUBLICATIONS

Extended European Search Report in related EP Application No. 19160754.8, dated Jul. 30, 2019.
Office Action received in related EP Application No. EP19160754.8, dated Jul. 12, 2021.

* cited by examiner

SYSTEMS AND METHODS FOR USE OF DISTRIBUTED LEDGER TECHNOLOGY FOR RECORDING AND UTILIZING CREDIT ACCOUNT TRANSACTION INFORMATION

CROSS REFERENCE TO RELATED APPLICATIONS

This application is a continuation of, and claims priority under 35 U.S.C. § 120 to, U.S. patent application Ser. No. 15/911,837, filed Mar. 5, 2018, the entire contents of which is incorporated fully herein by reference.

FIELD

This disclosed technology relates to maintaining and utilizing information associated with credit accounts, and more specifically to the use of distributed ledgers to record and utilize transaction information.

BACKGROUND

Conventional finance- and/or credit-related systems utilize centralized electronic databases as ledgers to record and store transaction information. In a typical banking ledger system for example, a central authority validates the authenticity of the transactions recorded in the database. While such databases have been used by financial institutions for decades, such centralized designs can present certain limitations and inefficiencies, for example, in updating, maintaining, validating, securing, and/or communicating the records and related information. Furthermore, in certain conventional systems, records may be susceptible to lost information, tampering, inadvertent changes, validation delays, etc.

Recent advances in computing power, cryptography, and network connectivity have enabled so-called distributed "blockchain" systems for applications that can simultaneously record transaction-related entries in multiple places, and at the same time. Unlike traditional centralized databases, however, such blockchain systems typically have no central data store or administration functionality: transactions are bundled into blocks that are chained together, and then broadcasted to other nodes in the network. Bitcoin is well-known digital currency that utilizes blockchain techniques and peer-to-peer networks in which transactions are replicated among nodes and validated without the traditional administrative or central controller.

Accordingly, there is a need for improved ledger systems and methods in which a balanced approach between centralized and distributed architecture is utilized to provide appropriate control and flexibility.

BRIEF SUMMARY

The disclosed technology includes a distributed ledger system for selectively controlling distributed ledgers. The system can include a plurality of nodes configured to store a plurality of distributed ledgers associated with a corresponding plurality of primary account numbers. The distributed ledgers can include one or more transaction blocks that are associated with one or more transaction records of an account corresponding to the primary account number.

In certain example implementations, the distributed ledger system is configured to establish, at a first node of the plurality of nodes, a first distributed ledger associated with a first primary account number. The system may allocate a first type block in the first distributed ledger, and the first type block may be utilized to identify a classification type associated with the first primary account number. The system may receive, at the first node, a first transaction indication associated with the first primary account number. Responsive to receiving the first transaction indication, the system may bind a first transaction block to the first distributed ledger. In certain example implementations, the first transaction block can include a first record associated with the first transaction indication. According to certain example implementations of the disclosed technology one or more transaction blocks may be configured for selective control by an API at the block level.

In accordance with certain example implementations of the disclosed technology, transaction information may be selectively replicated to other nodes of the system, for example, by selectively transmitting the first transaction block to at least a second node of the plurality of nodes. In response to an end-of-cycle indication, the first transaction block may be locked to prevent further modification.

Certain implementations of the disclosed technology include a hybrid-distributed ledger system that may provide a flexible, efficient and secure means to underwrite, record, process, and/or utilize transaction information.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
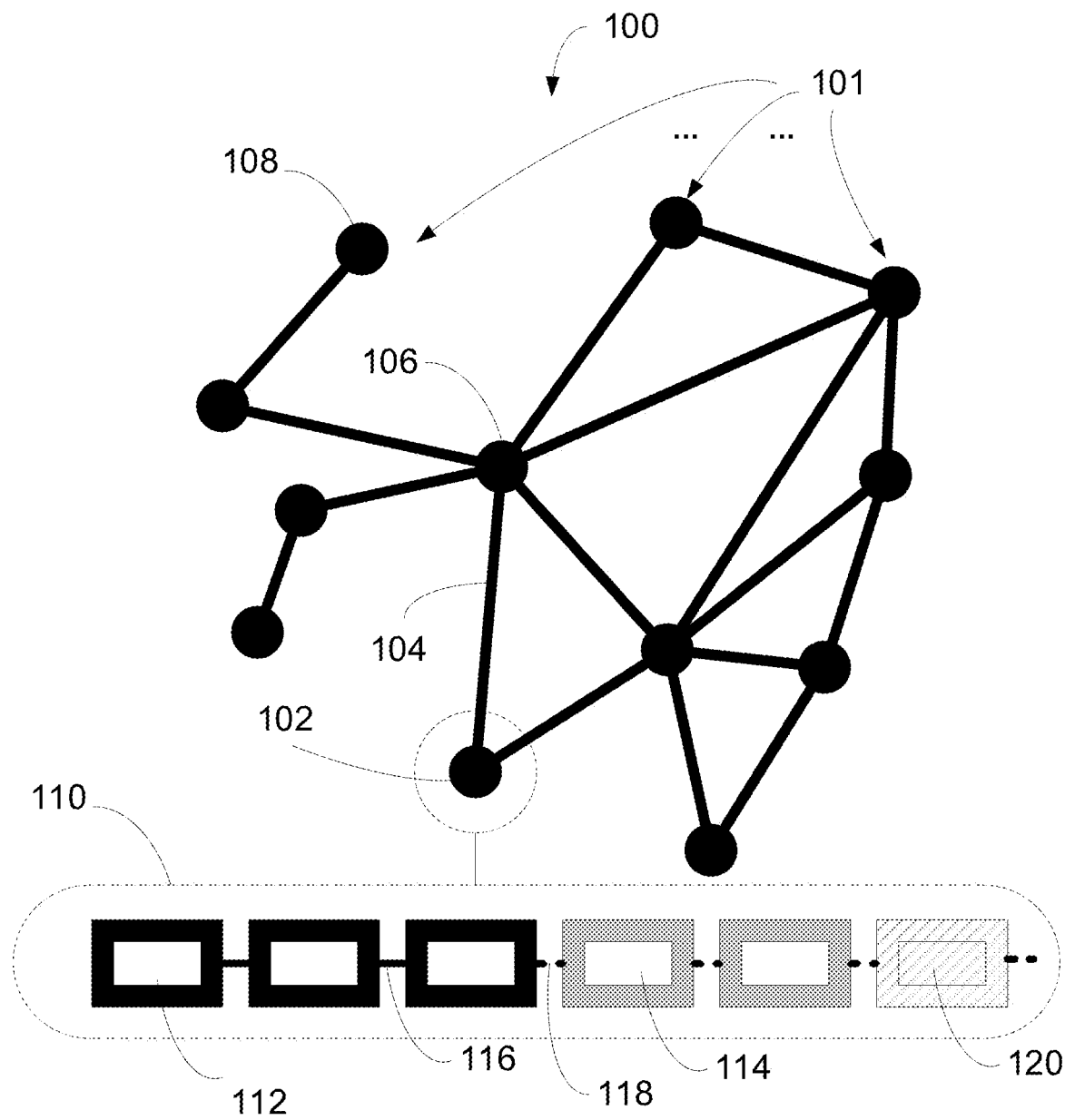
FIG. 1 depicts an example hybrid distributed ledger system 100 in which transaction blocks 112 are bound in chains 110 and stored at selected nodes, according to an example implementation of the disclosed technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to an example implementation of the disclosed technology, a distributed ledger system is provided for selectively controlling distributed ledgers (DL). The system includes a plurality of nodes storing a plurality of DLs associated with a corresponding plurality of primary account numbers (PAN) and having one or more transaction blocks associated with one or more transaction records of accounts corresponding to the PANs. The system is configured to: establish, at a first node of the plurality of nodes, a first DL associated with a first PAN; allocate a first type block in the first DL, the first type block identifying a classification type associated with the first PAN; receive, at the first node, a first transaction indication associated with the first PAN; responsive to receiving the first transaction indication, bind a first transaction block to the first DL, the first transaction block comprising a first record associated with the first transaction indication; selectively transmit, via a transceiver, the first transaction block to at least a second node of the plurality of nodes for selective replication; and responsive to an end-of-cycle indication, lock the first transaction block to prevent further modification.

According to another example implementation of the disclosed technology, a computer-implemented method is disclosed. The method includes receiving, by a first node of a distributed ledger system, a transaction message associated with an electronic transaction, wherein the distributed ledger system comprises a plurality of nodes, each node configured to store a plurality of distributed ledgers (DL), each DL is associated with a primary account number (PAN), each DL comprising one or more transaction blocks, and each of the one or more transaction blocks is associated with a transaction record of an account corresponding to the PAN; storing, in a memory of a first transaction block of a first DL associated with the first node, a data record representative of the electronic transaction; electronically transmitting to at least a second node of the plurality of nodes, an updated version of the first DL; and selectively validating one or more selected transaction blocks associated with one or more selected DLs of one or more selected nodes of the plurality of nodes.

According to another example implementation of the disclosed technology, a non-transitory computer readable storage medium is provided for storing instructions for use with a distributed ledger system (DLS), wherein the DLS includes a transceiver and a memory storage system in communication with a plurality of nodes, each node configured to store a plurality of distributed ledgers (DL), each DL is associated with a primary account number (PAN), each DL comprising one or more transaction blocks, and each of the one or more transaction blocks is associated with a transaction record of an account corresponding to the PAN, and wherein the instructions are configured to cause the DLS to perform a method comprising: receiving, by a first node of the DLS, a transaction message associated with an electronic transaction; storing, in a memory of a first transaction block of a first DL associated with a first PAN, a data record representative of the electronic transaction; electronically transmitting to at least a second node of the plurality of nodes, an updated version of the first DL; and selectively validating one or more selected transaction blocks associated with one or more selected DLs of one or more selected nodes of the plurality of nodes.

In another example implementation, a computer-implemented method is provided for selective control of distributed ledgers (DL) of a distributed ledger system (DLS), the DLS comprising a plurality of nodes, each node storing a plurality of DLs, each DL is associated with a primary account number (PAN), each DL comprising blocks, and each block is associated with a transaction record of an account corresponding to the PAN; the method comprising: allocating a type block in each DL, the type block identifying a classification type associated with the PAN; receiving at a first node of the plurality of nodes, a transaction indication associated with the PAN; responsive to receiving the transaction indication, binding a transaction block to the DL, the transaction block comprising a record associated with the transaction indication; selectively transmitting, via a transceiver, the transaction block to one or more nodes of the DLS for selective replication; responsive to an end-of-cycle indication, locking at least a portion of the transaction blocks to prevent further modification. According to an example implementation of the disclosed technology, the DL is configured for selective control by an API at the block level. In certain example implementations at least one of the blocks of the DL are configured to be reserved for one or more special events associated with the PAN.

FIG. 1 depicts an example distributed ledger system 100 according to an example implementation of the disclosed technology. The example system 100 can include a plurality of nodes 101 (represented by solid circles) joined by communication interconnections 104 (represented by lines). As depicted in the bottom portion of FIG. 1, and according to an example implementation, certain transaction blocks 112 may be bound 116 together to form chains 110, the chains 110 may be stored at selected nodes 102 of the plurality of nodes 101, and the chains 110 may be selectively replicated through the system 100.

In accordance with certain example implementations of the disclosed technology, each of the chains 110 assembled from the corresponding transaction blocks 112 may be associated with a particular primary account number (PAN). A plurality of chains 110, associated with a respective plurality of PANs may make up a local ledger, which may be distributed to one or more selected nodes of the plurality of nodes 101. For example, a given node 102 may be designated to store a plurality of distributed ledgers (DL), each associated with a corresponding PAN. In certain example implementations, each local ledger and/or DL is a chain 110 made of blocks 112, and each block 112 is associated with a transaction record of an account corresponding to the PAN.

In certain example implementations, one or more of the nodes 101 may be designated as a control node 106. In certain example implementations, one or more of the nodes 101 may be terminal nodes 108, such that communication to other nodes of the system 100 is made by communicating through a nearest node. In certain implementations, the designated control node(s) 106 may be configured to selectively control replication and distribution of a selected DL. For example, replication/distribution of a chain 110 to other nodes 101 of the system 100 may be selectively controlled by permissions encoded at the block 112 level. Such architecture provides a highly flexible and customizable way to distribute selected ledgers, chains 110, and/or blocks 112 to appropriate nodes 101 of the system 100.

In certain example implementations, the terminal nodes 108 may be interconnected 104 to a control node 106 by an intervening node. Thus, according to certain example implementations, it is not a necessary requirement to have all nodes directly interconnected 104 to one another. According to an example implementation of the disclosed technology, different levels of connectivity degrees may be utilized. For example, a first-degree connection between nodes may be designated when nodes are directly interconnected 104 (such as node 102 and node 106). Second-degree connections, for example, may be designated for those node pairs in which an intervening node provides the connectivity (such as node 106 and node 108).

According to an example implementation of the disclosed technology, each of the nodes 101 of the distributed ledger system 100 may include a server configured for communication with other nodes by respective Internet connections. Certain implementations may utilize cloud services as interconnections 104 among nodes 101. According to certain example implementations, the nodes 101 may be configured for interconnection 104 communication through a service provider.

According to an example implementation of the disclosed technology, and with continued reference to the bottom portion of FIG. 1, certain blocks of the chain 110 may be allocated and/or reserved for certain events or other PAN-specific data.

In accordance with certain example implementations of the disclosed technology, as new transaction indications associated with a given PAN are received, a new transaction block 114 may be written to capture the transaction information. Responsive to an end-of-cycle indication, the transaction block 114 may be locked and bound 118 to the chain 110, for example to prevent further modification. In certain example implementations, locking the chain responsive to the end-of-cycle indication may be utilized to preserve information in a compliant way for the issuer. For example, an issuer may employ certain controls to comply with the Truth in Lending Act (TILA) and associated requirements regarding minimum payments, amount of time to pay before late fees accrue, etc. Locking the chains 110 of blocks 114 at the end-of-cycle may be used as trigger for many (if not all) of these controls. In certain example implementations, any future edits by a node 108 to a block 114 (for example, to reflect merchandise return for a partial credit) to which the node 108 has read/write/edit/delete access may be written to the next segment of the chain 110 with a new block that references the old block to be edited or deleted. In this example implementation, the chain 110 may utilize such an edit, and may apply the same transaction, interest, and fee application rules to the new and/or edited block or chain 110.

In certain example implementations, selectively modifiable blocks 120 may be added and/or utilized within a selected chain 110, for example, to provide for future changes, instructions, demarcation, routing, etc. In certain example implementations, the selectively modifiable blocks 120 may be revised by certain nodes and/or APIs having appropriate permissions. For example, permissions may be set within a selectively modifiable block 120, and nodes and/or APIs having express authorization may revise certain data in the selectively modifiable block 120. In certain example implementations, selectively modifiable block 120 may be set with particular permissions and constraints. In one embodiment for example, the selectively modifiable block 120 may include a global read/write permission for all nodes 101. In another example embodiment, the selectively modifiable block 120 may include restricted permissions that will allow read/write by certain nodes, administrators, APIs, within designated time periods, etc. For example, block 120 may be designated as a "special permissions" block that is accessible by a third party, which may be represented by one or more of the nodes 101. In this example, instead of sending a payment posting file to the issuer at the end of every day, the authorized third party may write to a selectively modifiable block 120 that a payment was performed by the customer to the account represented by the chain 110. In certain example implementations, such modification may happen in real time as it is occurring (as opposed to nightly), which may help eliminate instances of misapplied payments and returns for insufficient funds from the third party back to the issuing or paying bank. In certain example implementations, dedicated blocks in the chain 110 may be reserved for specific sets of nodes 101. For example, one or more selectively modifiable blocks 120 may be reserved as external party payment posting blocks for third party nodes to allow for those blocks to consistently contain only certain transactions types and grant full write access to the selectively modifiable blocks 120 without allowing third party payment providers (or other entities) to write or edit any other kind of blocks, such as a transaction block 114.

According to an example implementation of the disclosed technology, permissions and/or constraints may also be set at the level of the chain 110. For example, a digital wallet may be configured with universal rules of the chain 110. Such universal rules may be based on the user and transaction blocks 112 accessed. For example, a transaction block 112 could be set for read access and write access, but not delete access.

In certain example implementations, certain blocks (such as selectively modifiable blocks 120) may be setup for a temporary authorized user. Such blocks may be setup with delete access and/or with temporary authorization that may be revoked at a different time. As an example, temporary tokens may be granted to a mobile device so that digital wallet purchases may be made without requiring internet access. Then, once the token is outdated, it may be deleted. In another example implementation, a block in a digital wallet may represent a request from a user for certain access rights to enable a third party to conduct a transaction on the user's behalf.

As may be apparent from the description above, the certain transaction blocks 112 within a chain 110 may be locked and bound to the chain 110 to prevent further modification or tampering, while other new blocks 114 may be written and bound to the chain 110 (for example, upon an end-of cycle). Yet other special selectively modifiable block 120 may be bound to the chain 110, but may include a mechanism for future modifications, temporary use, and/or specific third-party use. In some instances, there may be certain actions an issuer may need to take against an account (i.e., a chain 110) that may require complete revocation or stoppage of the chain. Examples where such actions may be appropriate include, death notifications, Anti-Money Laundering (AML) concerns, Specially Designated National (SDN) concerns, first party fraud, etc. According to certain example implementations of the disclosed technology, writing certain action blocks as links in the chain 110 may irrevocably freeze the chain 110 from further use, read/write/edit/delete, and/or access by all or certain nodes 101 in the DLS ecosystem, per the rules of the chain and the block being written.

Figure 2:
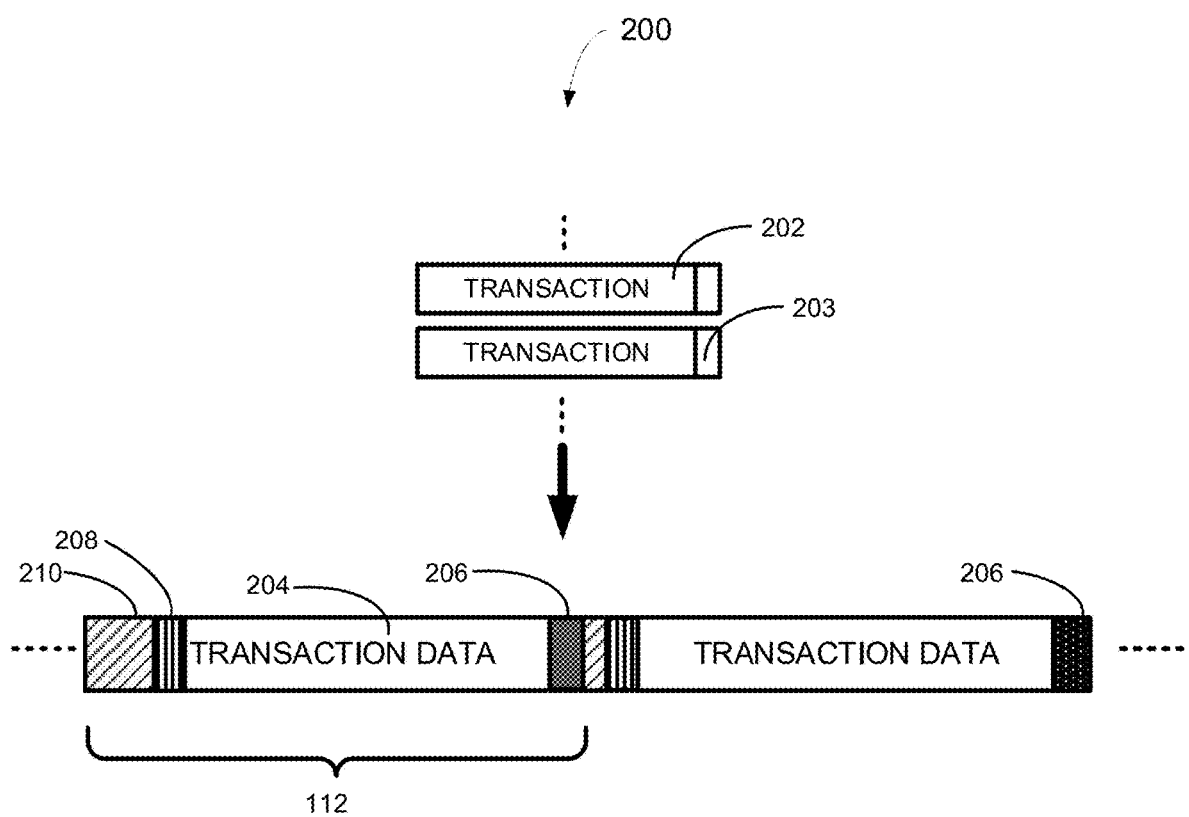
FIG. 2 depicts an example chain 200 made up of transaction blocks 112, according to an example implementation of the disclosed technology.

FIG. 2 is an example depiction of a chain 200 assembled from transaction blocks 112. In certain example implementations, the transaction blocks 112 may be appended to the chain 200 based on received information about a transaction 202. Each block 112 for example, may include transaction data 204 identifying a particular transaction 202 and/or associated information 203 such as a primary account number (PAN) associated with the transaction 202. In certain example implementations, block-level permission information 206 may be included in one or more blocks 112. In certain example implementations, chain-level permissions 208 and/or account classification/type information 210 may be included in the chain 202 and/or in one or more of the blocks 112. In certain example implementations, such permission information 206 208 and/or classification/type information 210 may be utilized to signal to the nodes of distributed ledger system how each chain and/or block may be handled, routed, modified, replicated, etc., as will be further explained below with reference to FIG. 4.

Figure 3:
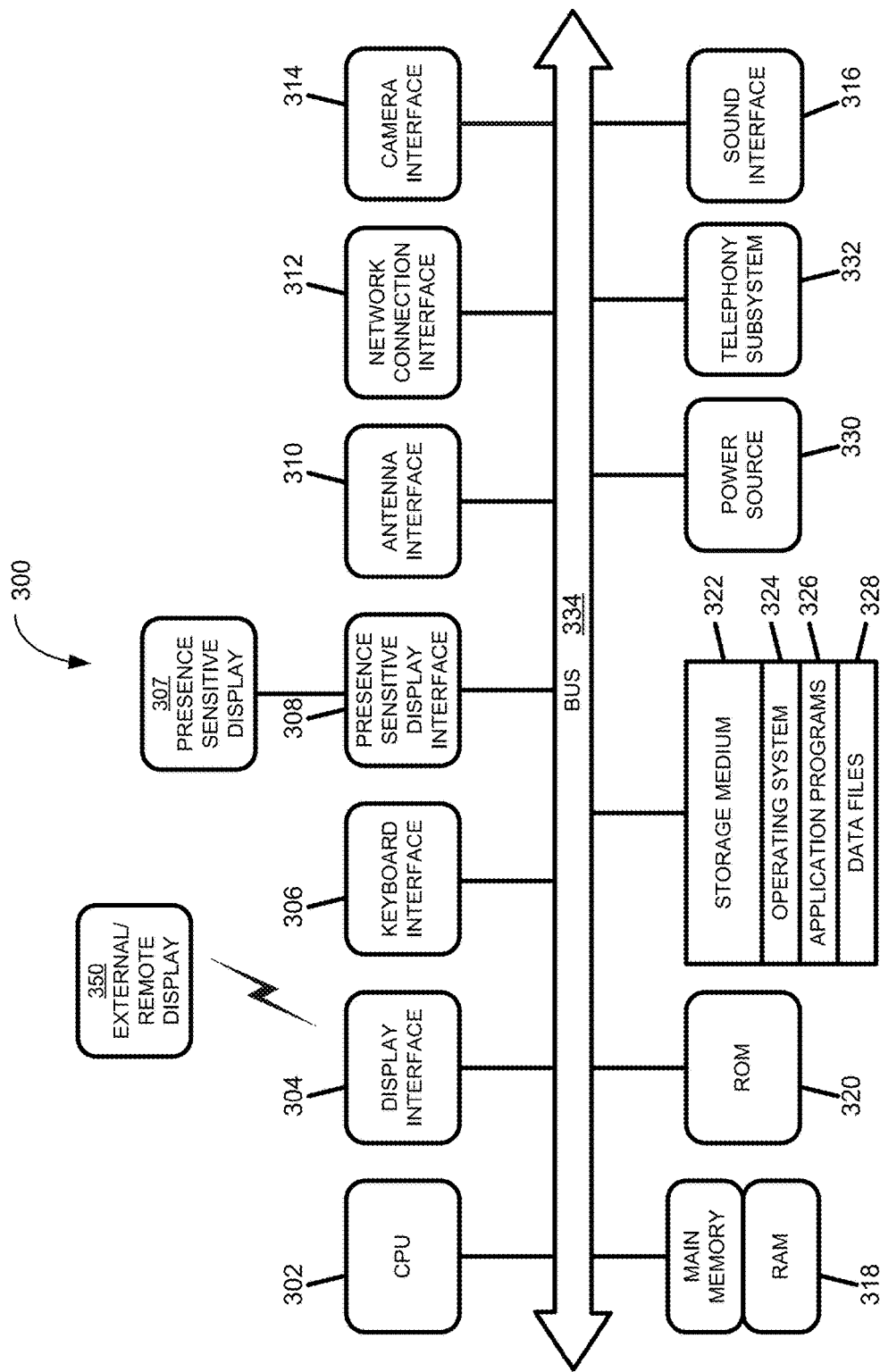
FIG. 3 is a block diagram of an illustrative computing device 300 according to an example implementation of the disclosed technology.

FIG. 3 depicts a block diagram of an illustrative computing device 300 according to an example implementation. Certain aspects of FIG. 3 may be embodied in nodes of the system (for example, the nodes 101 of system 100, as shown in FIG. 1). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more other nodes of a network via communication channels including, but not limited to Internet connections, satellite communications, wireless channels, cloud connections, etc.

In an example implementation, the computing device may output content to its local display and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. Certain example implementations of the antenna interface 310 can include one or more of: a receiver, analog-to-digital converter, sampler, buffers, memory, and memory. Certain example implementations can include a network connection interface 312 that provides a communication interface to a network (such as the interconnections 104 between nodes 101 in system 100, as shown in FIG. 1). In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EE- PROM), magnetic disks, optical disks, floppy disks, hard disks, removable cartridges, flash drives), where the files include an operating system 324, application programs 326 and content files 328 are stored.

In accordance with certain example implementations of the disclosed technology, the application programs 326 can include special-purpose software that may perform one or more of the following functions: receive data, decrypt encrypted data, examine the data for permissions, examine the data for classification/type information, process the data, encrypt data, route data to other nodes of the system, etc.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general-purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

Figure 4:
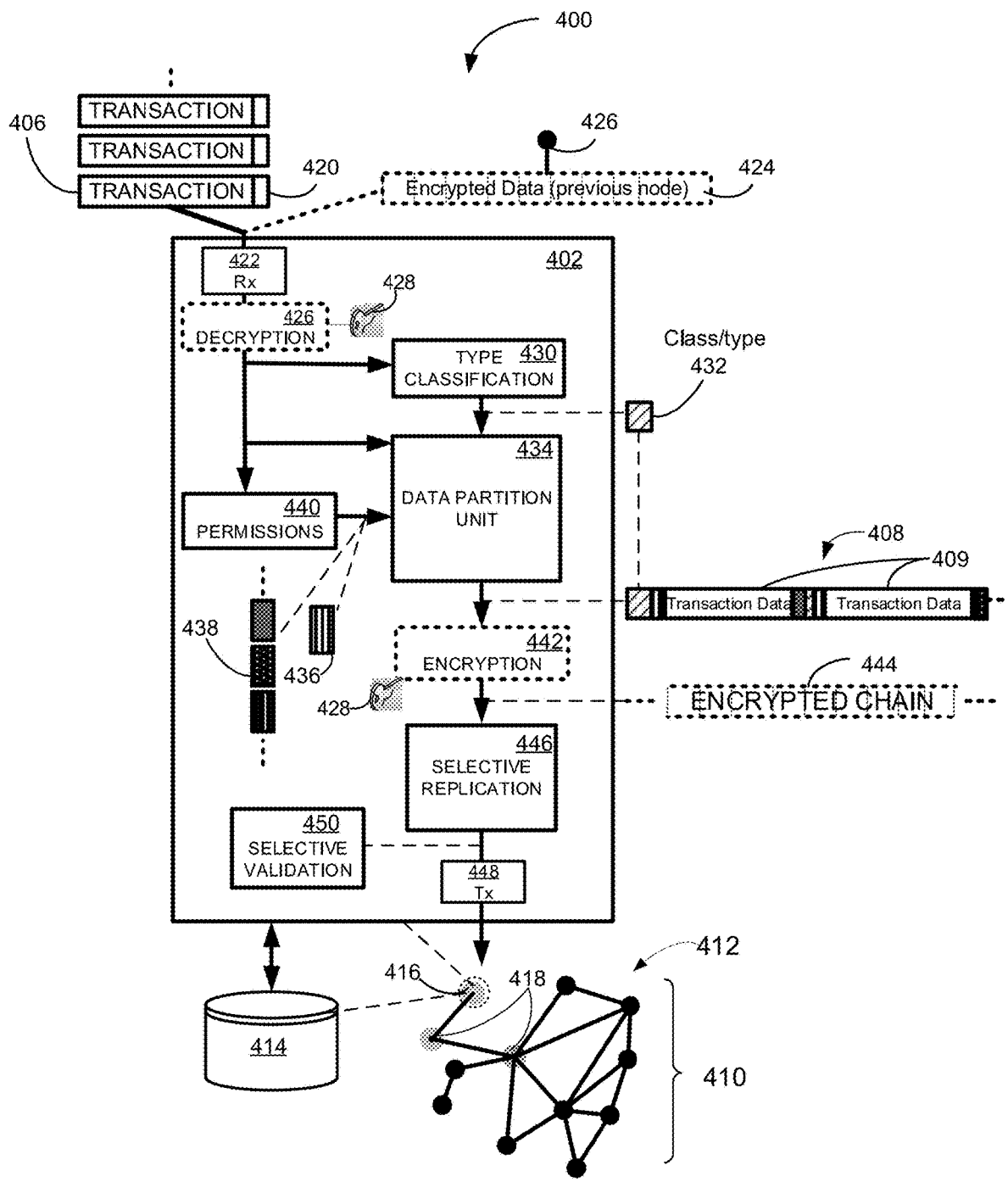
FIG. 4 is a block diagram of an illustrative distributed ledger processing system 400, according to an example implementation of the disclosed technology.

FIG. 4 is a block diagram of an illustrative distributed ledger processing system 400, according to an example implementation of the disclosed technology. As an overview, the system 400 may include a block and chain building module 402 configured to receive transaction indications 406, process associated blocks (such as blocks 112 as discussed with reference to FIG. 1) of the received associated transaction indications 406, and process ledger chains 408 based on the transaction indications 406 and/or blocks 409. In certain implementations the same or similar system 400 may reside one or more additional nodes 410 of a networked distributed ledger system 412 (which in certain example implementations may correspond to the system 100 as discussed with reference to FIG. 1).

Certain aspects of the distributed ledger processing system 400, for example, may be embodied as a computing device (such as computing device 300 as discussed with reference to FIG. 3). In some example implementations, certain processes associated with the chain building module 402 may be carried out in special application-specific hardware, while certain other processes may be handled by special-purpose software and/or firmware. In certain example implementations, chains 408 processed by the block and chain building module 402 may be stored in local memory 414, for example, at the local node 416 of the networked distributed ledger system 412 and/or distributed to other selected nodes 418 of the networked distributed ledger system 412, for example, based on the primary account number (PAN) associated with the chain 408 and/or other transaction-specific information.

In accordance with certain example implementations, received transaction indications 406 may include additional information 420, such as a reference to a primary account number (PAN), transaction amounts, date and time stamps, vendor information, etc. In certain example implementations of the disclosed technology the additional information 420 may be utilized by the block and chain building module 402 for processing/appending/binding transaction blocks 409 to the proper PAN-specific chain 408. According to an example implementation of the disclosed technology, the additional information 420 may include transaction details that contain account-specific information (like BINs and account IDs) to comprise a financial PAN (fPAN). In certain example implementations, transactions can also contain tokenized fPANS to mask fPANs for security. The additional information 420 can be any unique identifier supplied by the issuer, or another node that is also tokenizing or encrypting transactions 406, to apply against a specific chain. In certain example implementations, the additional information 420 may not be critical to the transaction and it can be shared with other nodes for the purposes of writing or editing blocks and affixing them to specific chains. In certain example implementations, each type of account specific information 420 may be unique to the type of block being written, so that any respective node type would have read/write/edit/delete access as appropriate for that block and that chain. In certain example implementations, the owner (or issuer) of the chain may have the holistic encryption/decryption key for the additional information 420 needed for a specific block (such as transaction block 406) and may share the key as needed with other nodes who obtain read/write access.

According to an example implementation of the disclosed technology, the block and chain building module 402 may receive transaction indications 406 via a receiver (Rx) 422. In certain example implementations, the module 402 may be configured to receive encrypted data 424, for example from a previous node 426 of the networked distributed ledger system 412. In certain embodiments, the module 402 may include a decryption module 426 configured with private/public key processing 428 capabilities to decrypt the received encrypted data 424. In certain example implementations, the module 402 may therefore be configured to handle initial transaction data (for example, as received from a vendor) and/or process encrypted data 424 from a previous node 426, which may provide certain flexibilities and technological improvements in field of distributed ledger systems.

Continuing with reference to FIG. 4, the received transaction indications 406 (and/or decrypted data) may then be processed by a type classification module 430, for example, to extract class/type information 432. In certain example implementations, the class/type information 432 may identify one or more of: an issuer of a credit card, a cardholder entity status, an account type, a primary account number associated with the credit card, an authentication code, and/or any other relevant information associated with the transaction and/or account. In certain example implementations, the class/type information 432 may identify one or more of: a test, a marketing event, a rate offer, check access; and a cash advance. In certain example implementations, such extracted class/type information 432 may be encoded in the chain 408 via a data partition unit 434. In certain example implementations, binding and/or locking of the chain may be performed by the data partition unit 434.

In accordance with certain example implementations of the disclosed technology, certain chain-level permissions 436 and/or block-level permissions 438 may be determined by a permissions module 440. As previously discussed with reference to FIG. 2 (and permission information 206 208), according to certain example implementations, the chain-level permissions 436 may be encoded into transaction chains by the data partition unit 434. In certain example implementations, block-level permissions 438 may be encoded into one or more transaction blocks 409 that make-up a chain 408 by the data partition unit 434. In certain example implementations, such permission information 436 438 and/or class/type information 432 may be utilized to signal to the nodes 410 of the networked distributed ledger system 412 how each chain 408 and/or block 409 should be handled, routed, modified, replicated, etc. Such classification and/or permission information encoded into each chain 408 and/or one or more blocks 409 of a distributed ledger provides technological improvements and efficiencies over conventional systems.

In certain example implementations, the data partition unit 434 may be in communication with a local memory storage 414, for example, to store and retrieve chains 408 and to append additional transaction blocks 409 to the chain 408 (as discussed with reference to the example transaction blocks 112 and chain 110 of FIG. 1). In certain example implementations, the data partition unit 434 may handle the binding of transaction blocks 409 to the appropriate chain 408. According to an example implementation of the disclosed technology, the data partition unit 434 may utilize PAN information (for example, in the extracted class/type data 432) to determine the proper chain 408 to be retrieved for appending with the transaction block 409.

According to an example implementation of the disclosed technology, the chain 408 output by the data partition unit 434 may be (optionally) encrypted by an encryption module 442 to produce an encrypted chain 444. Accordingly, either the non-encrypted chain 408 and/or the encrypted chain 444 may be stored in local memory 414 and/or prepared for and replication at selected nodes 418 of the networked distributed ledger system 412 by the selective replication module 446. For example, and according to certain embodiments of the disclosed technology, the selective replication module 446 may be configured to interpret one or more of the class/type 432 info, chain-level permissions 436, and/or block-level permissions 438 encoded into or associated with the chain 409 (and/or encrypted chain 444) to determine the appropriate node or nodes 410 of the networked distributed ledger system 412 for which the chain 409 (and/or encrypted chain 444) should be transmitted 448 and routed to for distribution/replication. In this sense, certain example implementations of the disclosed technology enable partial or full distribution of ledgers to a networked distributed ledger system 412 depending on various granular factors as may be governed by specifics of the PAN, or even the specifics of the transactions.

According to an example implementation of the disclosed technology, the block and chain building module 402 may include a selective validation module 450 that may be configured to validate certain selected chains 408 (and/or encrypted chains 444). In certain example implementations the validation process may be performed on locally processed chains. In other example implementations the validation process may be performed in conjunction with other selected nodes 418, depending on specifics of the PAN, or even the specifics of the transactions. In certain example implementations, validation may be performed by data count, check sum, and/or other processing of the data within the chains, for example to make sure that certain distributed chains have not been tampered with or revised. In certain example implementations, particularly in embodiments where block-level permissions 438 allow for revisions, such associated blocks may be masked from the validation process until locked, or revision permissions have been revoked or expired.

Figure 5:
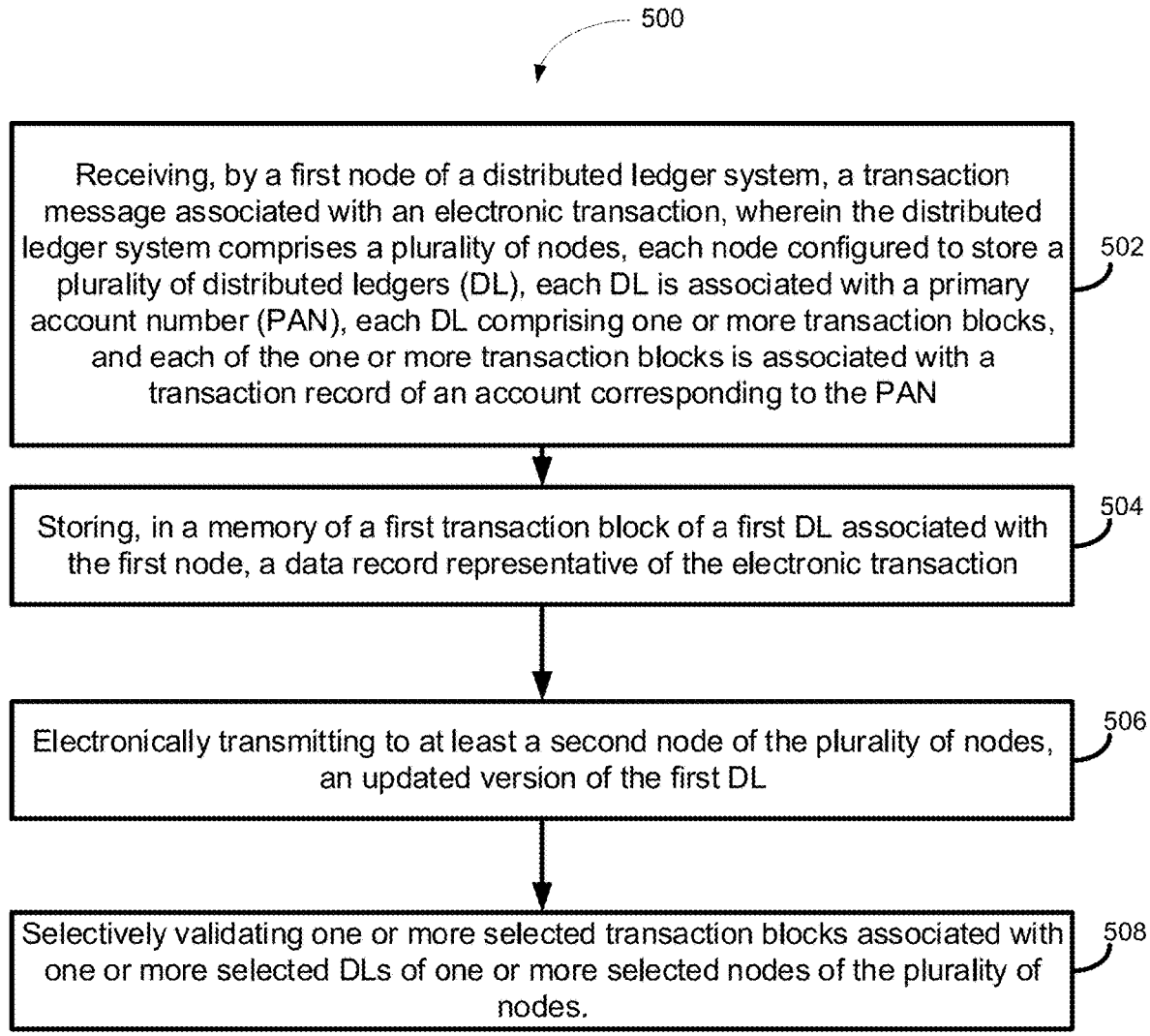
FIG. 5 is a flow diagram of a method 500 according to an example implementation of the disclosed technology.

FIG. 5 is a flow diagram of a method 500 according to an example implementation of the disclosed technology. In block 502, the method 500 includes receiving, by a first node of a distributed ledger system, a transaction message associated with an electronic transaction, wherein the distributed ledger system comprises a plurality of nodes, each node configured to store a plurality of distributed ledgers (DL), each DL is associated with a primary account number (PAN), each DL comprising one or more transaction blocks, and each of the one or more transaction blocks is associated with a transaction record of an account corresponding to the PAN. In block 504, the method 500 includes storing, in a memory of a first transaction block of a first DL associated with the first node, a data record representative of the electronic transaction. In block 506, the method 500 includes electronically transmitting to at least a second node of the plurality of nodes, an updated version of the first DL. In block 508, the method 500 includes selectively validating one or more selected transaction blocks associated with one or more selected DLs of one or more selected nodes of the plurality of nodes.

In certain example implementations, selectively validating can include validating a first transaction block of the first node. In certain example implementations, one or more selected transaction blocks are selectively validated according to a classification type of the PAN.

According to an example implementation of the disclosed technology, the transaction message may include an indicator representing a type of the transaction. In some implementations, the memory may be configured to store a plurality of data elements, each data element configured to represent a data value related to the transaction.

Certain example implementations of the disclosed technology may further include selectively storing, in a memory of the second node, the updated version of the first DL. In certain example implementations of the disclosed technology, one or more of the transaction blocks are locked at the end of a predetermined cycle.

Figure 6:
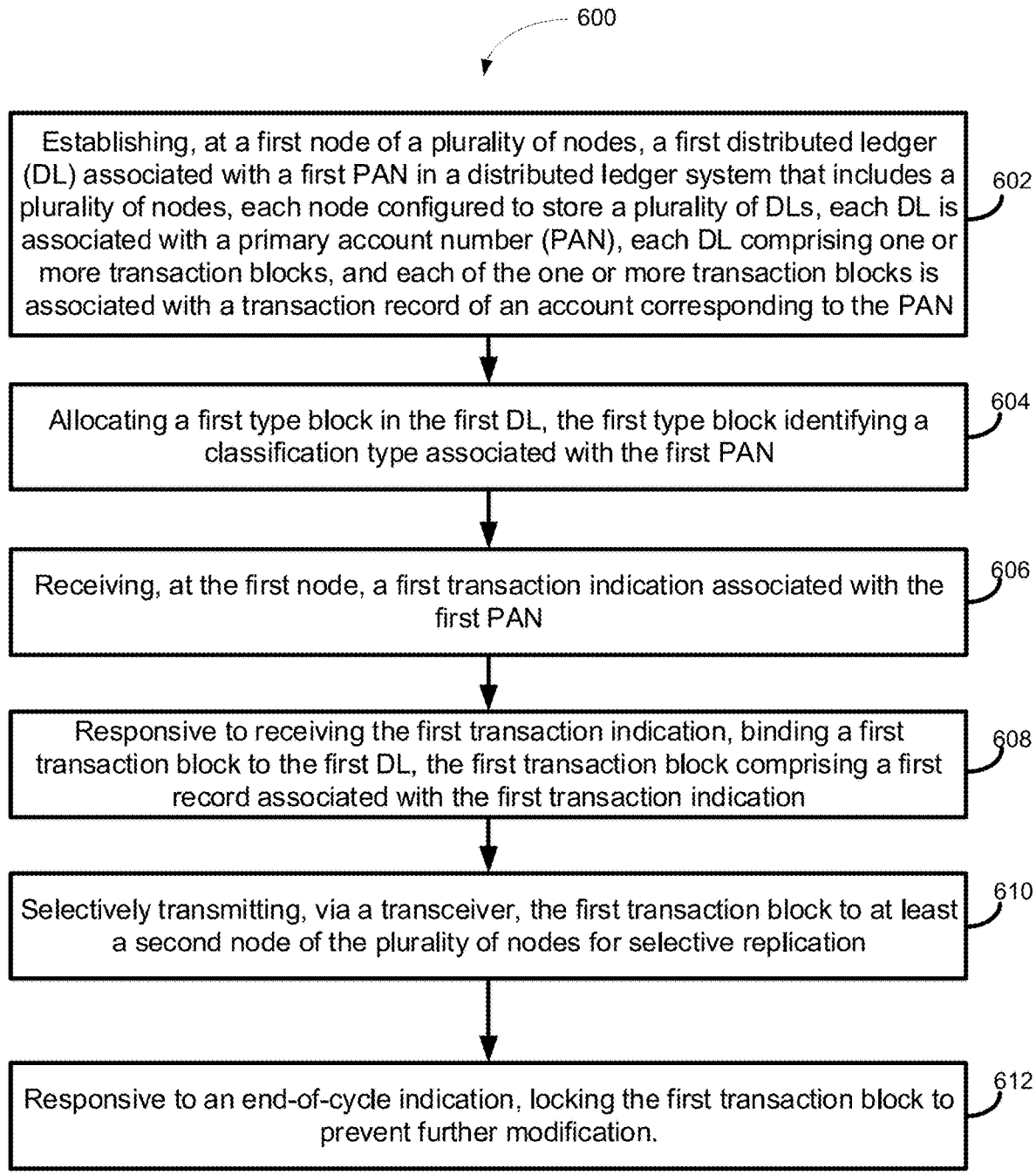
FIG. 6 is a flow diagram of a method 600 according to an example implementation of the disclosed technology.

FIG. 6 is a flow diagram of a method 600 according to an example implementation of the disclosed technology. In block 602, the method includes establishing, at a first node of a plurality of nodes, a first distributed ledger (DL) associated with a first PAN in a distributed ledger system that includes a plurality of nodes, each node configured to store a plurality of DLs, each DL is associated with a primary account number (PAN), each DL comprising one or more transaction blocks, and each of the one or more transaction blocks is associated with a transaction record of an account corresponding to the PAN. In block 604, the method 600 includes allocating a first type block in the first DL, the first type block identifying a classification type associated with the first PAN. In block 606, the method 600 includes receiving, at the first node, a first transaction indication associated with the first PAN. In block 608, and responsive to receiving the first transaction indication, the method 600 includes binding a first transaction block to the first DL, the first transaction block comprising a first record associated with the first transaction indication. In block 610, the method includes selectively transmitting, via a transceiver, the first transaction block to at least a second node of the plurality of nodes for selective replication. In block 612, and responsive to an end-of-cycle indication, the method 600 includes locking the first transaction block to prevent further modification.

In accordance with certain example implementations of the disclosed technology, one or more transaction blocks of the first DL is configured for selective control by an API.

In certain example implementations, the system and/or method 600 may further configured to perform one or more of the following elements: establish, at the second node, a second DL associated with a second PAN; allocate a second type block in the second DL, the second type block identifying the classification type associated with the second PAN; receive, at the second node, a second transaction indication associated with the second PAN; responsive to receiving the second transaction indication, bind a second transaction block to the second DL, the second transaction block comprising a second record associated with the second transaction indication; selectively transmit, via the transceiver, the second transaction block to at least the first node and a third node of the plurality of nodes for selective replication; and responsive to the end-of-cycle indication, lock the second transaction block to prevent further modification.

In certain example implementations, at least one of the first and second transaction blocks of the first and second DLs, respectively, is configured to be reserved for one or more special events associated with one or more of the first and second PANs.

In certain example implementations the one or more special events can include one or more of: a test; a marketing event; a rate offer; check access; and a cash advance.

In certain example implementations, the first PAN may be tokenized. In certain example implementations, first PAN identifies one or more of: an issuer of a credit card; a cardholder entity status; an account number associated with the credit card; and an authentication code.

Responsive to the end-of-cycle indication, certain implementation may allocate at least a second block of the first DL for future activity that can include one or more of a future cycle, a dispute, an account change, and a fraud event.

According to an example implementation of the disclosed technology, one or more of the transaction blocks may be selectively validated.

Certain example implementations of the disclosed technology may include a computer-implemented method for selective control of distributed ledgers (DL) of a distributed ledger system (DLS), the DLS comprising a plurality of nodes, each node storing a plurality of DLs, each DL is associated with a primary account number (PAN), each DL comprising blocks, and each block is associated with a transaction record of an account corresponding to the PAN. The method can include: allocating a type block in each DL, the type block identifying a classification type associated with the PAN; receiving at a first node of the plurality of nodes, a transaction indication associated with the PAN; responsive to receiving the transaction indication, binding a transaction block to the DL, the transaction block comprising a record associated with the transaction indication;

selectively transmitting, via a transceiver, the transaction block to one or more nodes of the DLS for selective replication; and responsive to an end-of-cycle indication, locking at least a portion of the transaction blocks to prevent further modification.

Certain example implementations of the disclosed technology may include a computer-implemented method for receiving, by a first node of a distributed ledger system (DLS), a transaction message associated with an electronic transaction, wherein the DLS comprises a plurality of nodes, each node configured to store a plurality of distributed ledgers (DLs), each DL is associated with a primary account number (PAN), each DL comprising blocks, and each block is associated with a transaction record of an account corresponding to the PAN; storing, in a memory of a first DL associated with the first node of the DLS, a data record representative of the electronic transaction; electronically transmitting to at least a second node of the plurality of nodes, an updated version of the first DL; and selectively validating one or more transaction blocks associated with one or more selected nodes of the DLS.

In certain example implementations, the transaction message can include an indicator representing a type of the transaction.

In certain example implementations, the memory is configured to store a plurality of data elements, each data element configured to represent a data value related to the transaction.

According to an example implementation of the disclosed technology, the method can include selectively storing, in a memory of a second node of the DLS, the updated version of the first DL. In certain example implementations, the one or more transaction blocks are selectively validated according to a classification type of the PAN. In certain example implementations, each block may be locked at the end of a predetermined cycle.

The systems and methods disclosed herein may take advantage of modern computer architecture for significant improvements in transaction processing via a decentralized or hybrid distributed database platform. Certain example implementations of the disclosed technology provide for global sharing of data, but only those parties having a legitimate need to know about data in certain blocks. In certain example implementations, workflow may be handled between nodes without a central controller. In certain example implementations, a consensus between chains and ledgers can be handled at the level of individual transaction. Certain example implementations of the disclosed technology may enable regulatory and supervisory observer nodes such that data may be validated by parties to the transaction rather than a broader pool of unrelated validators.

Certain example implementations of the disclosed technology provide a variety of consensus and/or validation mechanisms. For example, Certain example implementations of the disclosed technology may treat the interrelated mechanisms/services as selectable and customizable.

Certain example implementations of the disclosed technology provide a system for recording and managing transactions, shared across nodes, recording transactions according to customizations and permissions. Such transactions may be visible to the appropriate modules and/or nodes that are configured for proper deployment and security.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

Certain example implementations of the disclosed technology provide technological improvements in accounting, recording, and/or validating transactions associated with certain financial instruments. Certain example implementations of the disclosed technology may enable underwriting and/or reconciliation of account transactions via selective control and/or distribution of electronic ledgers.

Certain example implementations of the disclosed technology may improve efficiencies associated with credit card accounts, digital wallets, and similar instruments. A digital wallet, for example, can refer to an electronic device and associated software that allows an individual to make electronic transactions without having a physical credit card. The digital wallet, for example, may link to individual's bank account, credit card account, etc. In certain digital wallets, an individual's credentials, such as a driver's license, health card, loyalty card(s) and other ID documents can be stored and utilized for financial transactions and/or to authenticate the holder's credentials. Certain example implementations of the disclosed technology may allow account and transaction information to be distributed among multiple digital wallets for efficient utilization and/or validation. In certain example implementations, provisioning a card to a wallet may appear as an event in the chain.

Certain example implementations of the disclosed technology may provide new flexibilities in how credit is accrued and processed. Traditional credit card accounts, for example, typically operate on a 30-day billing cycle, in which transactions for a period accrue to the end-of-cycle. Interest is then charged on amounts that have not been paid within a predetermined time after the end-of-cycle. In contrast, certain example implementations of the disclosed technology can enable new and flexible ways to process transactions, billing cycles, and/or accrual based the individual account, transaction type, special offer, etc. For example, in one implementation, a credit card account may be designated so that the billing cycle is based on threshold amount of charged money. In this implementation, charges may be written to blocks until a threshold amount is reached. The block may then be frozen after the threshold amount is reached, and interest may start to accrue for that block if it has not been paid within 30 days.

In accordance with certain example implementations of the disclosed technology, the end-of-cycle flexibility provided herein may provide certain benefits for credit products that do not currently exist in unsecured revolving credit technology. For example, such flexibility may provide a level of control over spending habits on the part of consumers and businesses also not seen in other products and technology. For example, instead of setting a separate child account and authorized user on a credit card account (with its own credit line and cycle) the administrator of the card can simply assign a dollar limit of blocks that operates both as a spending limit and as an impetus to process any travel and expense reporting on the part of the end user, effectively providing two features in one. This has the added benefit of shortening the time to interest accrual for the issuer. In classic revolving credit situations, a $500 charge, for example, made on cycle day 1 may lead to 59 days of "float" for the user. In the case of transaction based end-of-cycle, there could be as little as 30 days of float for that transaction. Further, shortening the float window reduces bust out fraud, where an insidious player fabricates and identity, charges against the card limit, pays it off with a bad bank account, and then can start charging again. In certain example implementations of the disclosed technology, end-of-cycle based on transactions may be used to shorten the window of operation, potentially leading to lower bust out fraud losses overall.

Certain example implementations of the disclosed technology may be utilized to change the fundamental credit underwriting process. In one example implementation of the disclosed technology, the credit process may be revised so that it is no longer bound by a 30-day cycle. For example, the chain may be used to offer flexible lending, extend terms, and/or offer specific terms for a particular purchase by virtue of having transaction information in the individual transaction blocks. In one example implementation of the disclosed technology, a customer may purchase a large ticket item (such as a vehicle) and charge the transaction to their credit account. The associated transaction block in the chain may reflect the type of purchase, and specific purchase-type terms can be applied for this purchase block.

We claim:

1. A computer-implemented method comprising:
   receiving, by a first processor of a distributed ledger (DL) system, a transaction message associated with an electronic transaction, the transaction message comprising block-level permission data and transaction data associated with a primary account number (PAN);
   extracting, by the first processor, the transaction data and the block-level permission data from the transaction message;
   appending, by the first processor, to a first PAN-specific chain of the DL system, a first block comprising the extracted transaction data;
   setting the first block as modifiable by an Application Programming Interface (API) of the DL system according to the extracted block-level permission data;
   subsequent to setting the first block as modifiable, receiving, by the first processor, transaction data for the PAN;
   based on the setting of the first block as modifiable, modifying, with the API of the DL system, the modifiable block by updating the extracted transaction data in the first block with the received transaction data;
   retrieving, by the first processor, from a database, an end-of-billing-cycle indication;
   responsive to the end-of-billing-cycle indication:
      adding, by the first processor, a block to the first PAN-specific chain;
      receiving, by the first processor, transaction data subsequent to the adding of the block,
         wherein the transaction data comprises the PAN;
      writing, by the first processor, the transaction data comprising the PAN to the added block; and
      electronically distributing, by the first processor, to at least a second processor of the DL system, the first PAN-specific chain.

2. The method of claim 1, further comprising:
   validating the first PAN-specific chain prior to appending the first PAN-specific chain with the first block by verifying that the first PAN-specific chain has not been revised.

3. The method of claim 2, wherein validating comprises performing a check sum process.

4. The method of claim 1, wherein the first PAN-specific chain includes a classification indication designation one or more special events associated with the first PAN, wherein the one or more special events comprise one or more of: a test, a marketing event, a rate offer, check access, and a cash advance.

5. The method of claim 1, wherein the transaction message comprises an indicator representing a type of the electronic transaction.

6. The method of claim 1, further comprising storing, in a memory in communication with the first processor, one or more of: the block-level permission data and the appended first PAN-specific chain.

7. The method of claim 1, wherein the extracted block-level permission data includes instructions to prevent modification of the first block by the API after a predetermined date.

8. The method of claim 1, wherein the transaction message further comprises one or more of: transaction amounts, a date stamp, a time stamp, vendor information, read permissions, write permissions, edit permissions, and delete permissions.

9. The method of claim 1, wherein the first PAN comprises one more of: an issuer of a credit card, a cardholder entity status, an account number associated with the credit card, and an authentication code.

10. The method of claim 1, further comprising allocating at least a second block of the first PAN-specific chain as one or more of: a dispute, an account change, and a fraud event.

11. A non-transitory computer readable storage medium storing instructions for use with a distributed ledger system (DLS), when the instructions are executed by a first processor of the DLS, cause the first processor of the DLS to perform the functions of:
   receiving a transaction message associated with an electronic transaction, the transaction message comprising block-level permission data and transaction data associated with a primary account number (PAN);
   extracting the transaction data and the block-level permission data from the transaction message;
   appending, to a first PAN-specific chain of the DLS, a first block comprising the extracted transaction data;
   setting the first block as modifiable by an Application Programming Interface (API) of DLS according to the extracted block-level permission data;
   subsequent to setting the first block as modifiable, receiving transaction data for the PAN;
   based on the setting of the first block as modifiable, modifying, with the API of DLS, the modifiable block by update the extracted transaction data in the first block with the received transaction data;
   retrieving, from a database, an end-of-billing-cycle indication;
   responsive to the end-of-billing-cycle indication:
      adding a block to the first PAN-specific chain;
      receiving transaction data subsequent to the adding of the block, wherein the transaction data comprises the PAN;
      writing the transaction data comprising the PAN to the added block; and
      electronically distributing to at least a second processor of the DL system, the first PAN-specific chain.

12. The non-transitory computer readable storage medium of claim 11, wherein the instructions are further configured to cause the first processor of the DLS to:

validate the first PAN-specific chain prior to appending the first PAN-specific chain with the first block by verifying that the first PAN-specific chain has not been revised.

13. The non-transitory computer readable storage medium of claim 11, wherein the instructions are further configured to cause the first processor of the DLS to verify that the first PAN-specific chain has not been revised by performing a check sum process.

14. The non-transitory computer readable storage medium of claim 11, wherein the first PAN-specific chain includes a classification indication designating one or more special events associated with the first PAN, wherein the one or more special events comprise one or more of: a test, a marketing event, a rate offer, check access, and a cash advance.

15. The non-transitory computer readable storage medium of claim 11, wherein the extracted block-level permission data includes instructions to prevent modification of the first block by the API after a predetermined date.

16. The non-transitory computer readable storage medium of claim 11, wherein the transaction message further comprises one or more of: transaction amounts, a date stamp, a time stamp, vendor information, read permissions, write permissions, edit permissions, and delete permissions.

17. The non-transitory computer readable storage medium of claim 11, wherein the first PAN identifies one more of: an issuer of a credit card, a cardholder entity status, an account number associated with the credit card, and an authentication code.

18. The non-transitory computer readable storage medium of claim 11, wherein the instructions are further configured to cause the first processor of the DLS to allocate and allocate at least a second block of the first PAN-specific chain as one or more of: a dispute, an account change, and a fraud event.

* * * * *